United States Patent [19]
Lee

[11] 3,885,823
[45] May 27, 1975

[54] WINTER EMERGENCY BRAKE SYSTEM

[76] Inventor: Poy Lee, 52 Tennyson St., Somerville, Mass. 02145

[22] Filed: Aug. 3, 1973

[21] Appl. No.: 385,419

[52] U.S. Cl. ............... 291/15; 291/23; 291/38; 291/3
[51] Int. Cl. ............... B60b 39/04; B61h 11/00
[58] Field of Search ............. 291/3, 23, 25, 38, 15

[56] References Cited
UNITED STATES PATENTS

| | | | |
|---|---|---|---|
| 2,625,417 | 1/1953 | Sundheim | 291/3 |
| 2,712,954 | 7/1955 | Huber | 291/15 X |
| 3,034,816 | 5/1962 | Thompson | 291/23 X |
| 3,168,960 | 2/1965 | Dean et al. | 291/38 X |
| 3,774,945 | 11/1973 | Lee et al. | 291/38 |

FOREIGN PATENTS OR APPLICATIONS

| 458,915 | 8/1949 | Canada | 291/23 |
|---|---|---|---|

Primary Examiner—Robert S. Ward, Jr.
Attorney, Agent, or Firm—Wolf, Greenfield & Sacks

[57] ABSTRACT

A sand storage and deposition tank is disposed proximate to each wheel of the vehicle for depositing sand preferably ahead of its corresponding wheel to reduce skidding of the vehicle. Each tank has a valve associated therewith that is preferably hydraulically operated via a fluid conduit coupling to the master cylinder of the vehicle so that upon application of the brakes the sand can be deposited. Each tank may be fed from a supply tank or may itself comprise separate tank compartments including a lower compartment from which the said is deposited and an upper compartment that fills the lower compartment but only when the lower compartment is not depositing sand.

10 Claims, 8 Drawing Figures

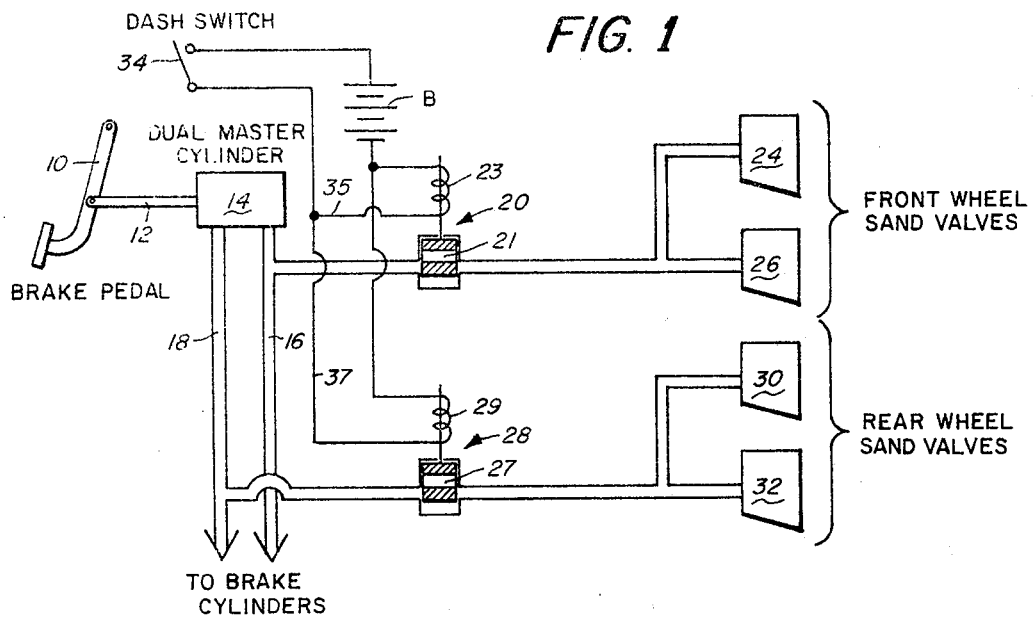
FIG. 1
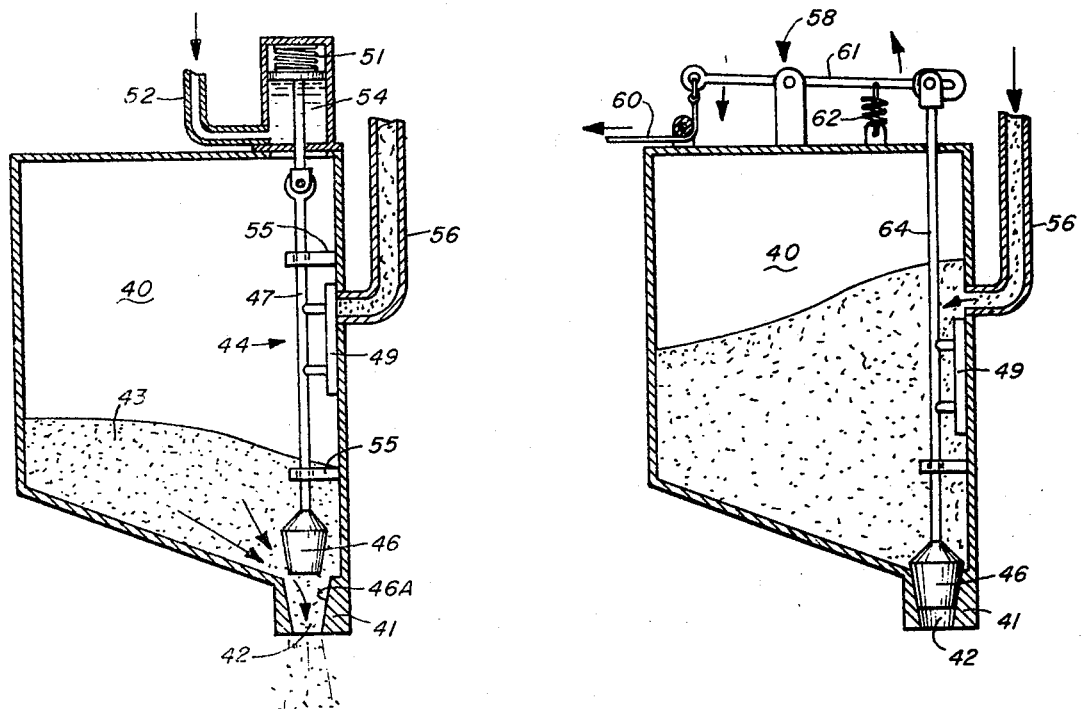
FIG. 2
FIG. 3

WINTER EMERGENCY BRAKE SYSTEM

FIELD OF THE INVENTION

The present invention relates in general to an apparatus for use with a motor vehicle for depositing sand adjacent to one or more of the wheels of the vehicle. More particularly, the present invention relates to a sand deposition apparatus of the type that comprises a main storage compartment from which the sand is deposited and an auxiliary storage compartment for feeding the main storage compartment. The apparatus of this invention may be operated to deposit sand adjacent all the wheels of the vehicle or adjacent the rear wheels only.

BACKGROUND OF THE INVENTION

There are prior art devices used for depositing sand in the path of travel of a motor vehicle. For example, one such device is shown in U.S. Pat. No. 3,032,361. The prior art apparatus has certain disadvantages associated therewith. For example, these devices may not be quickly operable especially in an emergency situation and many of the devices are quite complex and require periodic maintenance in order to assure their proper operation.

Also, prior art apparatus is generally limited in the amount of sand or the like material that can be handled by the apparatus. In addition, the known systems do not provide switch selection means for permitting operation of either two or four of the valve mechanisms associated with the apparatus.

Accordingly, it is an object of the present invention to provide an improved sand deposition apparatus for a motor vehicle wherein the sand is deposited upon application of the brake of the vehicle.

Further object of the present invention is to overcome some of the prior art problems associated with known devices, and in particular provide a relatively simple sand deposition apparatus that is preferably hydraulically operated and preferably coupled to the existing brake hydraulic system of the vehicle.

Still another object of the present invention is to provide a sand deposition apparatus comprising at least one sand storage means adjacent to a wheel wherein the sand storage means includes separate compartments, the lower one of which contains the sand to be deposited and the upper one of which feeds the lower compartment when sand is not being deposited.

Still a further object of the present invention is to provide a sand deposition apparatus having valve means associated with each wheel of the vehicle and further characterized by means for selecting operation of, for example, two or four of the valve means in a selective manner.

SUMMARY OF THE INVENTION

To accomplish the foregoing and other objects of this invention, there is provided an apparatus for use with a motor vehicle having wheels and a brake pedal. The apparatus is for depositing sand or the like material on the roadway adjacent at least one wheel of the vehicle. This apparatus in one embodiment comprises a storage tank positioned adjacent the wheel and having an outlet through which sand may be deposited. A valve means is associated with the tank and includes means responsive to the valve means being in a first position for closing the outlet and responsive to the valve means being in a second position for opening the outlet. The valve means is preferably of the hydraulically operated type. The apparatus also includes means responsive to actuation of the brake pedal of the vehicle for causing the valve means to change to its second position wherein the outlet is open. This means for causing the valve means to change its position preferably includes fluid conduit means that couples to the normal hydraulic system already present in the motor vehicle.

In accordance with one aspect of the present invention the storage tank is preferably divided into two separate compartments and means are provided permitting communication between these compartments. The valve means associated with the storage tank preferably has an operable closure member which in one position permits sand deposition and blocks sand flow between the two compartments, and in a second position inhibits sand deposition and permits sand flow between the two compartments.

BRIEF DESCRIPTION OF THE DRAWINGS

Numerous other objects, features and advantages of the invention will now become apparent upon a reading of the following detailed description taken in conjunction with the accompanying drawings in which:

FIG. 1 is a schematic diagram showing one system constructed in accordance with the principles of the present invention;

FIG. 2 shows a hydraulically operated embodiment of the storage tank of the present invention with the valve means in a position to permit sand deposition;

FIG. 3 is a cross-sectional view similar to that shown in FIG. 2 for a mechanically operated embodiment of the invention and with the valving mechanism inhibiting sand deposition;

DETAILED DESCRIPTION

Figure 4:
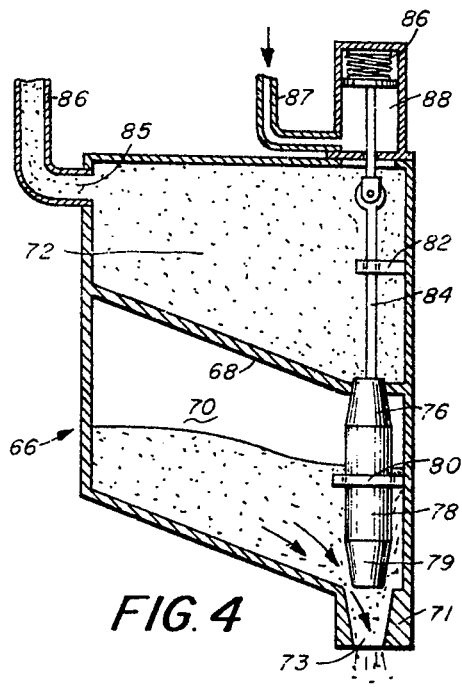
FIG. 4 is a cross-sectional view of another embodiment of a dual compartment storage tank with the valve means in a position to permit sand deposition.

My copending application Ser No. 198,375, now U.S. Pat. No. 3,774,945, shows a system for depositing sand adjacent the wheels of a vehicle. That application teaches the placement of the storage tanks associated with the system. The placement of the tanks in accordance with the present invention may be in a similar manner as taught by that application.

FIG. 1 of the present invention shows in part components of a conventional automobile and in part the components added in accordance with the improvement of the present invention. FIG. 1 shows a brake pedal 10 that is coupled by way of linkage 12 to a dual master cylinder 14. The master cylinder 14 has output hydraulic fluid lines 16 and 18 coupled therefrom. These lines connect to the brakewheel cylinders for causing operation of both the rear and the front sets of brakes.

The conduit 16 also couples by way of a first valve means 20 to the front wheel sand valves 24 and 26. Similarly, the fluid conduit 18 couples by way of valve means 28 to rear wheel sand valves 30 and 32. The valve means 20 and 28 are operable by way of switch 34 to either permit or inhibit fluid flow to the front and rear wheel sand valves. The valve means 20 is schematically shown as including a stop 21 and associated coil 23. The stop 21 would of course include a ferromagnetic material for causing the stop 21 to be selectively attracted by the coil 23 when a current is flowing therein. Similarly, the valve means 28 includes a stop 27 and associated coil 29. The coils 23 and 29 couple to one side of battery B. The other side of battery B couples by way of switch 34 and lines 35 and 37 back to the respective coils 23 and 29. When a switch 34 is closed the coils 23 and 29 are energized, the stops 21 and 27 are attracted by their associated coils and the hydraulic fluid in conduits 16 and 18 is allowed to pass to the front and rear wheel sand valves. Of course, in order for the sand valves to be operated the brake pedal 10 must be depressed.

FIG. 2 is a cross-sectional view of one embodiment of a storage tank 40. In one embodiment, each of the wheels of the vehicle has a storage tank disposed adjacent thereto as is taught by my copending application Ser. No. 198,375. The storage tank 40 includes a bottom nozzle 41 defining an outlet 42 through which the sand 43 may be deposited. In FIG. 2 there is shown the valve mechanism 44 which generally comprises a closure member 46, straight linkage 47, slide bar 49, and piston 51. In the position shown the hydraulic fluid has passed through conduit 52 to reservoir 54 causing the piston 51 to move upwardly. When this occurs the straight linkage 47 also moves upwardly and the closure member 46 fixed to the bottom end thereof lifts from its seatwall 46A permitting the sand 43 to be deposited through the outlet 42. The straight linkage 47 is moved through guides 55 secured to a wall of the storage tank 40.

In the position shown in FIG. 2 the slide bar 49 is in a position to block sand fed by way of pipe 56. One end of pipe 56 couples to storage tank 40 and the other end may couple to an auxiliary storage tank not specifically shown in FIG. 2. Thus, in FIG. 2 the valve mechanism is in a position wherein sand may be deposited but only a limited amount can be deposited, that is the amount contained within the main storage tank, as flow by way of pipe 56 into the storage tank is blocked by slide bar 49.

FIG. 3 shows the storage tank 40 which is substantially the same as shown in FIG. 2 but includes a mechanical valving mechanism 58 in place of the hydraulic arrangement shown in FIG. 2. In this arrangement, when the brakes are applied a rod 60 is pulled thereby causing the arm 61 to lift against the bias of spring 62 which in turn causes the straight linkage 64 to raise. In the position shown in FIG. 3 the rod 60 has not been moved as the brakes have not been actuated and thus the straight linkage 64 is shown in its lowest position with the closure member 46 seated within the nozzle 41 of the storage tank. In this position the slide bar 49 is deposed below the end of pipe 56 and thus when sand deposition is not permitted by way of outlet 42 the slide bar 49 does permit flow of the sand by way of pipe 56 from an auxiliary storage tank to the tank 40.

FIG. 4 is a cross sectional view of another embodiment of the present invention that is hydraulically operated similar to the embodiment shown in FIG. 2 and wherein the storage tank 66 includes a divider wall 68 for partitioning the tank into a lower compartment 70 and an upper compartment 72. The lower compartment 70 has a nozzle 71 defining an outlet 73 through which the sand is deposited. The divider wall 68 has an aperture 74 (see FIG. 5) therein for accommodating the top end 76 of closure member 78 which also includes a bottom end 79. The closure member 78 is guided by means of guideplate 80 affixed to a vertical wall defining the storage compartment. There is also included a second guide 82 for guiding the straight linkage 84 which coupled at its top end to piston 86.

The compartment 72 has an inlet opening 85 which couples to pipe 86 which has its other end coupled to an auxiliary storage tank not shown in the drawings. The sand feeds in the auxiliary storage tank by way of pipe 86 into the upper compartment 72. When the hydraulic fluid is flowing in conduit 87 to reservoir 88 the piston 86 is at its top most position and the straight linkage 84 causes the end 76 of the closure member to seal the aperture 74 preventing any sand from flowing from compartment 72 to compartment 70. The lower end 79 of closure member 78 is raised from the outlet 73 and the sand contained within compartment 70 is permitted to flow through the outlet 73.

Figure 5:
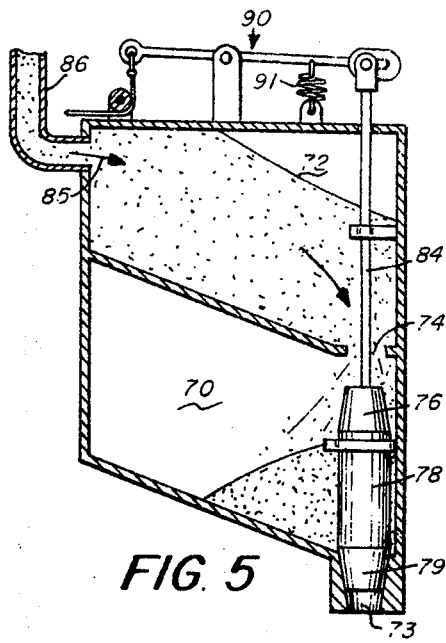
FIG. 5 is a cross-sectional view similar to that shown in FIG. 4 but for a mechanical embodiment of the invention and with the valving mechanism in a position to inhibit sand deposition.

Referring now to FIG. 5 there is shown a cross-sectional view similar to that shown in FIG. 4. Like reference characters are used in both of these figures where appropriate.

In place of the hydraulic mechanism shown in FIG. 4 there is shown a mechanical mechanism 90 in FIG. 5. This mechanism is substantially the same as the mechanism 58 shown in FIG. 3 and the straight linkage 84 is substantially the same as the linkage shown in FIG. 4. In the position shown in FIG. 5 the mechanism 90 is not operated and the spring 91 causes the straight linkage 84 to be at its lower position wherein the end 79 is seated to prevent sand flow by way of outlet 73. At the same time, with the opposite end 76 in its lower position the aperture 74 is uncovered and the sand in compartment 72 is permitted to flow by way of aperture 70 into the lower compartment 70. Upon application of the brakes in the embodiment of FIG. 5 the straight linkage 84 is urged upwardly sealing the aperture 74 and permitting the sand in compartment 70 to flow through the outlet 73.

Figure 6:
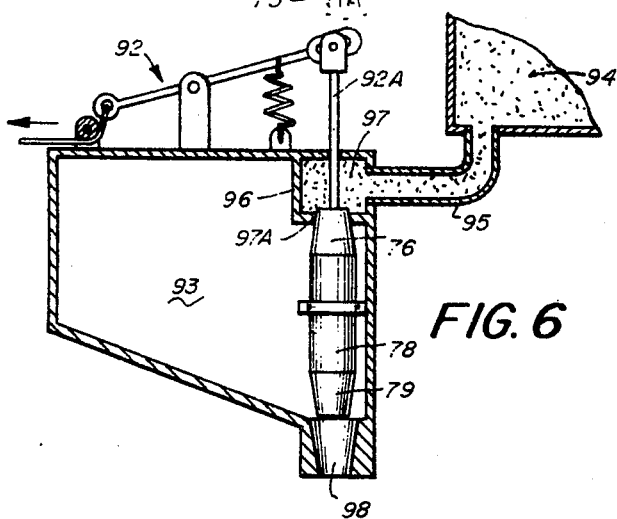
FIG. 6 is a cross-sectional view showing another embodiment of the present invention.
Figure 8:
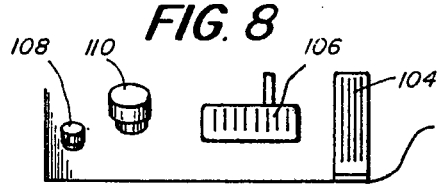
FIG. 8 is a fragmentary perspective view in the driving compartment of the vehicle and showing the enabling switch depicted in FIG. 1.

FIG. 6 is a cross-sectional view of still another embodiment employing a mechanical valving mechanism 92 similar to that shown in FIGS. 3 and 5 and also showing a main storage tank 93 and an auxiliary storage tank 94 inter-connected by a pipe 95. The storage tank 93 includes a wall 96 defining a small sand reservoir 97 having an inlet opening from pipe 95 and an outlet aperture 97A. In FIG. 8 the closure member 78 has its top end 76 in a position covering the aperture 97A and its bottom end 79 unseated from the output 98 associated with the main compartment 93. When the mechanism 92 is released the straight linkage 92A descends, the aperture 97A is uncovered by end 76, and sand deposition is prevented in that end 79 of the closure member is now sealed against the outlet 98.

Figure 7:
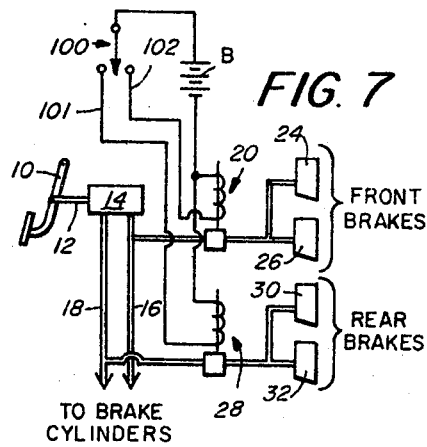
FIG. 7 is a schematic diagram showing still another arrangement in accordance with the present invention.

The schematic diagram shown in FIG. 7 is substantially the same as the one shown in FIG. 1 and thus like reference characters will be used where appropriate. The main difference is that the switch 34 shown in FIG. 1 is replaced by way of a three position switch 100. This switch is shown in its inoperative position wherein the energy from battery B is not coupled to either of the valve means 20 or 28. Thus, hydraulic fluid flow is prevented to either the front or rear wheel sand valves. When the switch 100 is moved so that the energy from the battery is coupled to line 101 the rear wheel sand valves are permitted to operate and when the switch is moved to the alternate position wherein the power from the battery is coupled to line 102 then the front wheel sand valves are permitted to operate. In still another embodiment there could be provided a fourth position wherein all four of the wheel sand valves could be operated.

FIG. 8 shows a portion of a floor area of the driving compartment illustrating the gas pedal 104, brake pedal 106, and dimmer switch 108. In this embodiment the switch 110 which is a foot operated switch may replace the switch 34 shown in FIG. 1. Switch 110 could be a momentary switch or any other type of simple two position switch.

The embodiments of the present invention disclosed herein are solely for the purpsoe of illustrating the principles of the present invention. The invention is to be limited only by the appended claims.

What is claimed is:

1. Apparatus for use with a motor vehicle having wheels, a brake pedal, a master brake cylinder operated in response to application of the brake pedal and fluid lines coupling from the master brake cylinder to separate wheel brake means, said apparatus for depositing sand or the like on a roadway adjacent at least one wheel of the motor vehicle, and comprising:

a tank positioned adjacent the wheel and having an outlet through which sand may be deposited and an inlet through which sand may selectively flow to the tank, a first valve means including a fluid operated valve and a closure member responsive to said fluid operated valve being in a first position for closing the outlet and in a second position for opening the outlet, means including fluid conduit means coupling from the vehicle fluid line to the fluid operated valve and responsive to actuation of the brake pedal of the vehicle for causing said valve to change to its second position for opening the outlet, and a second valve means disposed in the fluid conduit means and having alternate positions for either permitting or preventing fluid flow to the first valve means.

2. The apparatus of claim 1 wherein said second valve means is electrically operated and has circuit means associated therewith including a switch disposed within the driving compartment of the vehicle for selectively operating the second valve means.

3. The apparatus of claim 2 including a battery in series with said switch and an actuating coil of the second valve means.

4. The apparatus of claim 3 wherein said second valve means includes at least two valve means and said switch is a two position switch for selectively enabling either valve means of said second valve means.

5. The apparatus of claim 1 wherein said first valve means includes means for selectively opening and closing the inlet in response to operation of the closure member.

6. The apparatus of claim 5 wherein said means for opening and closing includes a slide plate and said first valve means further comprises a linkage means connecting to both the closure member and slide plate.

7. The apparatus of claim 5 wherein said inlet is closed when the outlet is open and the inlet is open when the outlet is closed.

8. A storage apparatus for sand or the like for use with a motor vehicle to deposit the sand on the roadway adjacent at least one wheel of the vehicle, comprising:

a tank having means defining an inlet and means defining an outlet disposed below the inlet, and a valve mechanism comprising a closure member, linkage means for coupling to and operating said closure member and a slide plate fixedly attach to said linkage member and slidable along a wall of the tank to close said inlet when said outlet is opened by movement of said closure member away from said outlet.

9. The apparatus of claim 8 including means for supporting the linkage member from a wall of the tank.

10. The apparatus of claim 9 wherein said valve mechanism includes a hydraulically operated piston and cylinder arrangement.

* * * * *